United States Patent [19]
Sinn et al.

[11] Patent Number: 5,422,080
[45] Date of Patent: Jun. 6, 1995

[54] SOLIDS CIRCULATION ENHANCING AIR DISTRIBUTION GRID

[75] Inventors: Brian T. Sinn, Williamsport; Song Wu, Montoursville; Michael G. Alliston, Lewisburg, all of Pa.

[73] Assignee: Tampella Power Corporation, Williamsport, Pa.

[21] Appl. No.: 208,658

[22] Filed: Mar. 9, 1994

[51] Int. Cl.[6] .............................................. B01J 8/24
[52] U.S. Cl. .................................... 422/143; 110/245; 34/359; 34/370; 34/579; 34/582
[58] Field of Search ................ 422/143, 311; 110/245; 165/104.16; 431/7, 170; 34/359, 370, 376, 576, 579, 582, 585, 589

[56] References Cited

U.S. PATENT DOCUMENTS

| | | | |
|---|---|---|---|
| 3,910,849 | 10/1975 | Kawabata | 422/141 X |
| 4,259,088 | 3/1981 | Moss | 422/143 X |
| 4,931,259 | 6/1990 | Okamoto et al. | 422/143 |
| 5,184,671 | 2/1993 | Alliston et al. | 422/142 X |
| 5,230,868 | 7/1993 | Engstrom | 422/143 |

Primary Examiner—Timothy M. McMahon
Attorney, Agent, or Firm—Notaro & Michalos

[57] ABSTRACT

A biased air distribution grid is used to promote solids entrainment and dense bed internal mixing for the bed material of a fluidized bed reactor. The air distribution grid distributes air at a high velocity zone having a velocity ranging from 11 to 50 feet per second and a low velocity zone having a velocity ranging from 3 to 10 feet per second. The high velocity zone and the low velocity zone provide an improved lateral mixing for the reactor.

5 Claims, 3 Drawing Sheets

SOLIDS CIRCULATION ENHANCING AIR DISTRIBUTION GRID

FIELD AND BACKGROUND OF THE INVENTION

The present invention relates, in general, to fluidized beds and, in particular, to a new and useful air distribution grid having biased air distribution in order to promote solids entrainment and internal mixing of the bed material.

The known air distribution systems utilized currently in fluidized bed reactors distribute air uniformly throughout the bed material of the fluidized bed. One of these known systems is an air distribution grid which is used to induce uniform and stable fluidization across the entire cross-section of the bed. Because of this uniform air distribution, only a certain level of solids circulation within the fluidized bed is achieved.

Presently, there is no known system or method for enhancing the solids circulation within a fluidized bed reactor other than the circulation which is achieved by uniform air distribution grids.

SUMMARY OF THE INVENTION

The present invention pertains to the circulating of solids contained in a bed of material in fluidized bed reactors. The present invention is an air distribution grid which enhances solids circulation of the bed material of a fluidized bed by injecting air into the bed at a high velocity zone and a low velocity zone in order to improve entrainment of solids, internal recirculation of solids, and lateral mixing of the solids which improve fuel, sorbent and temperature distribution for a fluidized bed reactor.

The present invention provides for injecting air into the bed material at a high volume for creating a high velocity zone at a velocity ranging from 11 to 50 feet per second. Air is also injected into the bed at a low velocity zone at a velocity ranging from 3 to 10 feet per second. Preferably, the high velocity zone ranges from 14 to 25 feet per second and the low velocity zone ranges from 6 to 10 feet per second.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
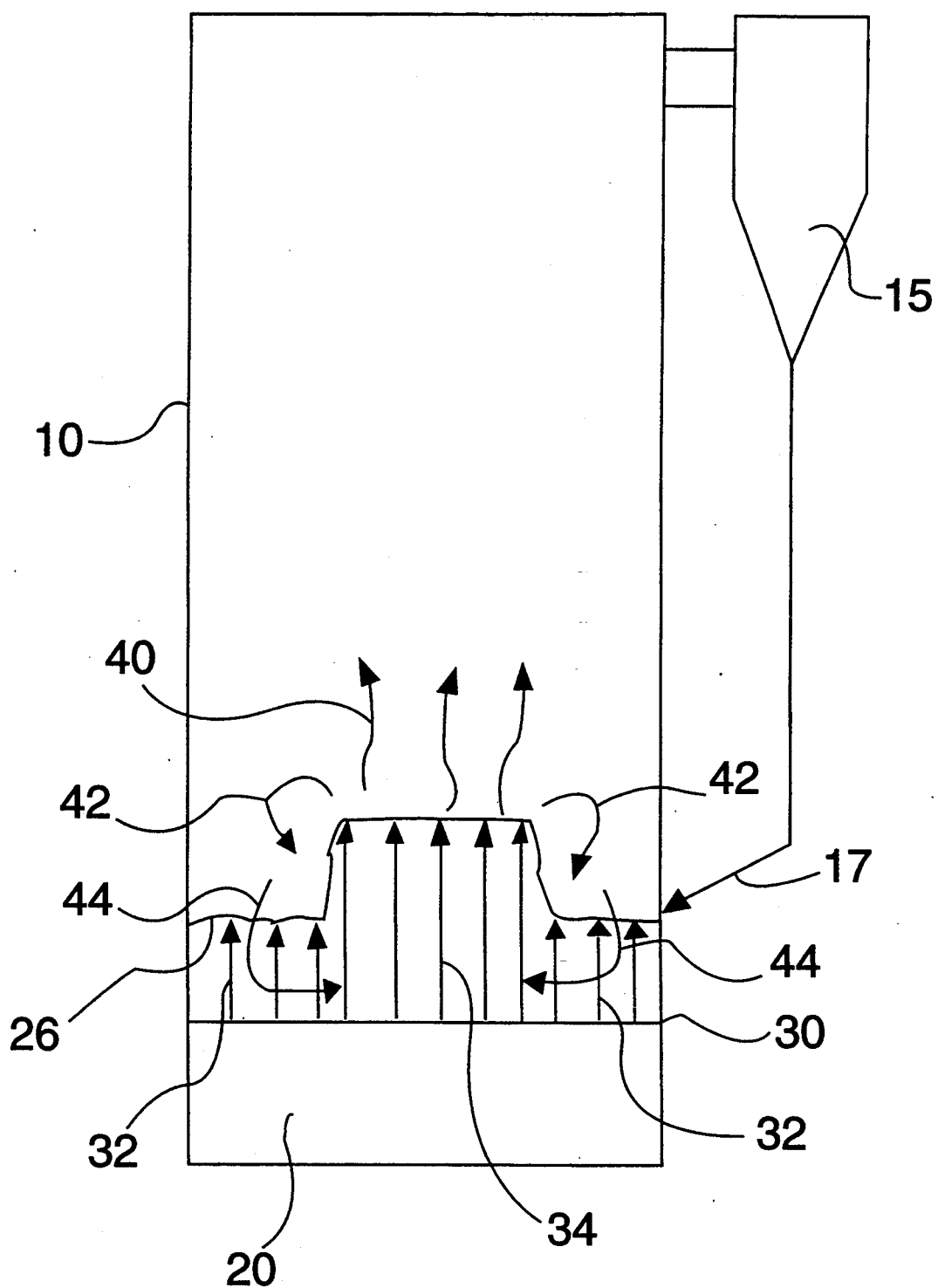
FIG. 1 is a schematic view illustrating the present invention.

The present invention pertains to enhancing the solids circulation of the bed material of a fluidized bed through air distribution. The present invention is used in conjunction with a fluidized bed reactor 10 having a dense bed 26 of material containing solids which are circulated within the reactor 10. A cyclone separator 15 is used in conjunction with the reactor 10 to receive process gas from the reactor 10 in order to separate solids which are provided back into the reactor 10 at a solids return 17.

Air is provided to the reactor 10 by air plenum 20 which is connected to an air distribution grid 30 which injects the air into the dense bed 26. Air distribution grid 30 injects the air at a high velocity zone 34 and at a low velocity zone 32 in order to promote solids entrainment and dense bed internal mixing. The high velocity zone 34 causes entrained solids 40 in the process gas to exit the dense bed 26 to the upper regions of the reactor 10. The biased distribution of air at air distribution grid 30 causes an internal recirculation of solids 42 and a lateral mixing of solids 44.

Air is injected in the low velocity zone 32 to obtain a velocity ranging from 3 to 10 feet per second and preferably ranging from 6 to 10 feet per second in the bed. Simultaneously, air is injected in the high velocity zone 34 to obtain a velocity ranging from 11 to 50 feet per second and preferably 14 to 25 feet per second in the bed. It has been found that these velocity ranges promote the circulation of solids from the bed material 26 better than known systems and methods used for solids circulation.

The high velocity zone 34 induces solids entrainment loadings 5% to 50% greater than loadings found in the known uniform distribution grids. The low velocity zone 32 provides for improved combustion staging in the dense bed zone for reduced emissions. The high velocity zone 34 and the low velocity zone 32 provide for improved lateral mixing 44 in order to improve fuel, sorbent and temperature distribution for the reactor 10.

Figure 2:
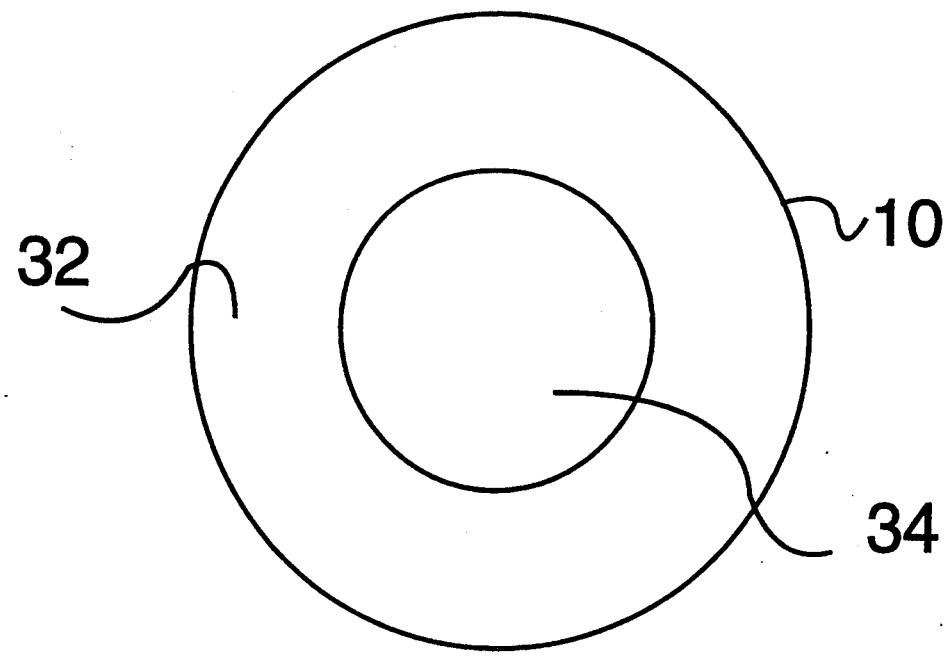
FIGS. 2-4 are views schematically illustrating the positioning of the present invention within a fluidized bed reactor.
Figure 3:
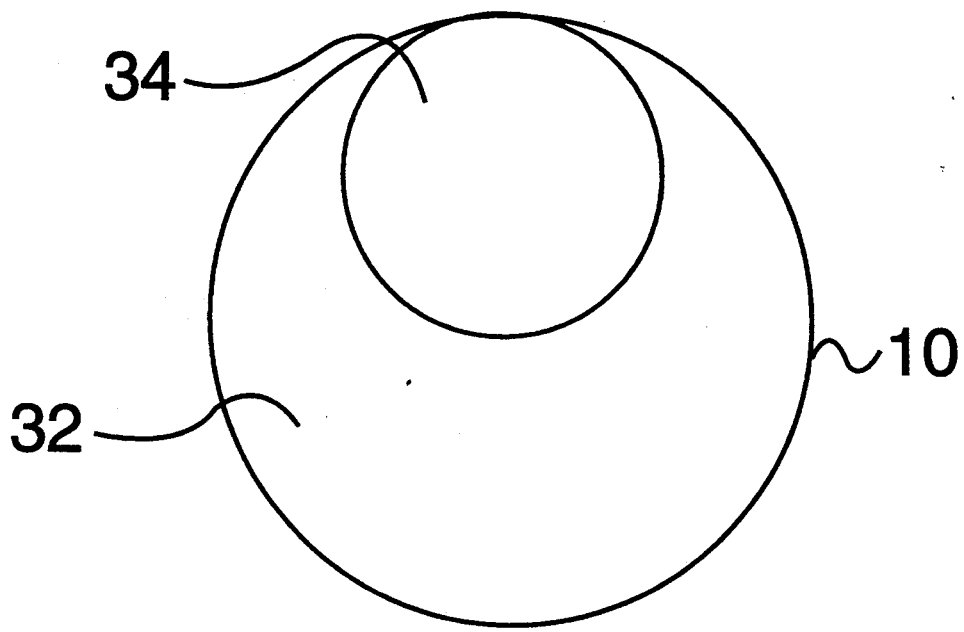
Figure 4:
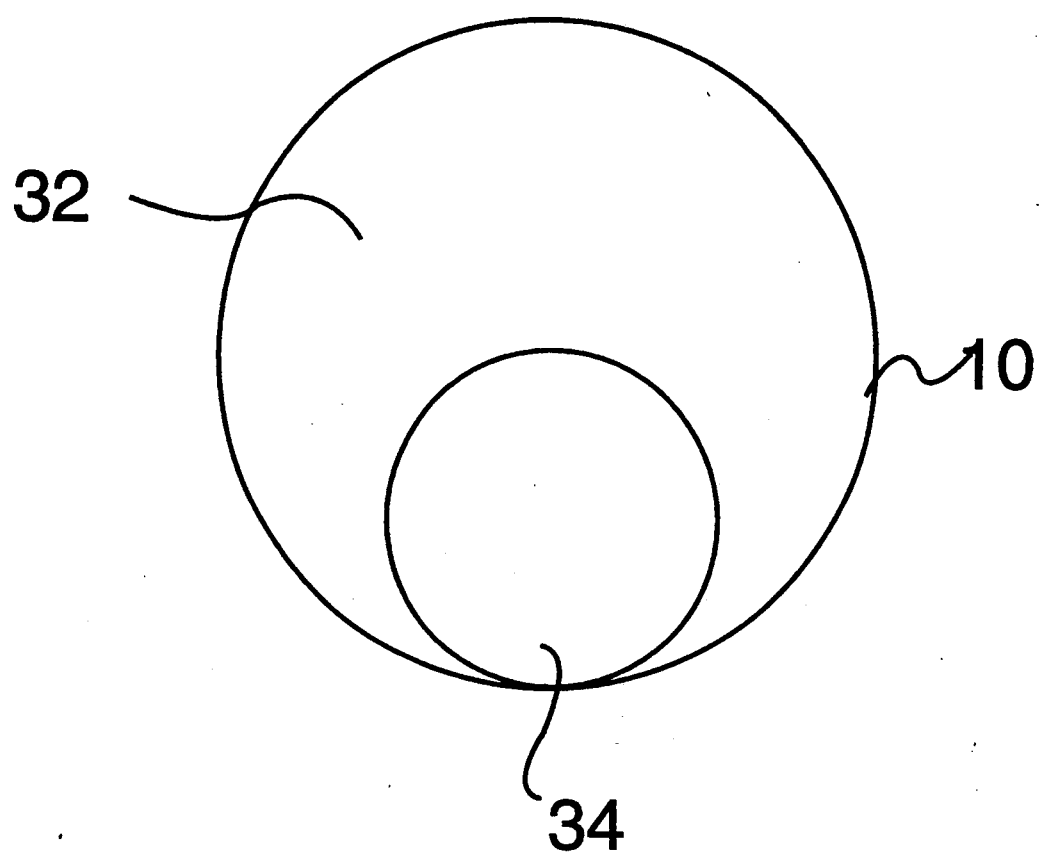

The high velocity zone 34 can be located at various locations of the reactor 10 including being located at the center of reactor 10 as shown in FIG. 2. Moreover, the high velocity zone 34 can be located at the periphery of the reactor 10 such as either the front wall or the back wall of the reactor 10 as shown in FIGS. 3 and 4. Although a circular reactor cross-section and high velocity zone is shown, rectangular, other polygonal or other reactor shapes and high velocity zone shapes are included within the scope of the present invention.

An advantage of the present invention is that heat transfer is improved by 2% to 5% over known systems based on a reduction in temperature, i.e, 10° F. to 40° F. in the reactor 10. This reduces the amount of reactor heat transfer surface needed.

The differential in flow velocity between zone 32 and zone 34 can be achieved either by utilizing tuyeres or other types of air nozzles which are more restricted or different in configuration in the low velocity zone 32 than in the high velocity zone 34, resulting in the higher velocity of gas in the high velocity zone, or by partitioning, baffling or otherwise subdividing plenum or windbox 20 so that more fluidizing gases are channeled to zone 34 than is channeled to zone 32.

While specific embodiments of the invention have been shown and described in detail to illustrate the application of the principles of the invention, it will be understood that the invention may be embodied otherwise without departing from such principles.

What is claimed is:

1. A method for circulating solids in a fluidized bed reactor having a bed material, the method comprising:
   providing a reactor containing a bed of material;

injecting air at a first air velocity into the bed in a low velocity zone extending substantially around a periphery area of the bed in order to fluidize the material of the bed to move at a first bed velocity in the low velocity zone;

injecting air at a second air velocity into the bed in a high velocity zone which is substantially surrounded by the low velocity zone in order to fluidize the material of the bed to move at a second bed velocity in the high velocity zone;

the bed of material containing solids, the second air velocity and the second bed velocity being sufficiently greater than the first air velocity and the first bed velocity so that particles from the high velocity zone are entrained out of the bed of material and upwardly in the reactor to a greater extent than particles from the low velocity zone so that at least some entrained particles from the high velocity zone are recirculated to and mixed with particles in the low velocity zone;

removing at least some entrained particles which leave the bed of material from the reactor;

separating the entrained particle which leave the reactor from gases in the entrained particles that leave the reactor; and returning the entrained particles which leave the reactor back to the bed material.

2. The method according to claim 1, including injecting the air at the low velocity zone to obtain a first bed velocity ranging from 3 to 10 feet per second.

3. The method according to claim 1, including injecting the air at the high velocity zone to obtain a first bed velocity ranging from 11 to 50 feet per second.

4. The method according to claim 2, including injecting the air at the high velocity zone to obtain a first bed velocity ranging from 11 to 50 feet per second.

5. A method according to claim 1, including injecting the air in the low velocity zone to obtain a first bed velocity ranging from 6 to 10 feet per second and injecting the air in the high velocity zone to obtain a second bed velocity of from 14 to 25 feet per second.

* * * * *